United States Patent [19]
Gauthier

[11] Patent Number: 5,965,777
[45] Date of Patent: Oct. 12, 1999

[54] PROCESS TO REMOVE CATALYST POISONS FROM HOP EXTRACTS

[75] Inventor: George Gauthier, Groton, Conn.

[73] Assignee: Cultor Food Service, Inc., Helsinki, Finland

[21] Appl. No.: 08/739,455

[22] Filed: Oct. 29, 1996

[51] Int. Cl.$^6$ .......................... C07C 45/62; C07C 45/67; C07C 61/00; C12C 3/00

[52] U.S. Cl. .................. 568/347; 568/377; 568/350; 426/422; 426/600; 562/400; 502/301; 502/315; 502/325

[58] Field of Search .................. 426/600, 422; 568/347, 377, 350; 562/400; 502/301, 315, 325

[56] References Cited

U.S. PATENT DOCUMENTS

| | | | |
|---|---|---|---|
| 3,044,879 | 7/1962 | Koch et al. | 99/50.5 |
| 3,079,262 | 2/1963 | Hougen et al. | 99/50.5 |
| 4,154,865 | 5/1979 | Grant | 426/600 |
| 4,247,483 | 1/1981 | Baker et al. | 568/341 |
| 4,297,509 | 10/1981 | Chiasson . | |
| 4,767,640 | 8/1988 | Goldstein et al. | 426/600 |
| 4,778,691 | 10/1988 | Todd, Jr. et al. | 426/600 |
| 4,918,240 | 4/1990 | Todd, Jr. et al. | 568/366 |
| 4,929,773 | 5/1990 | Ryan . | |
| 5,013,541 | 5/1991 | Hay . | |
| 5,166,449 | 11/1992 | Todd, Jr. et al. | 568/377 |
| 5,200,227 | 4/1993 | Guzinski et al. | 426/600 |
| 5,296,637 | 3/1994 | Stegink et al. | 568/341 |
| 5,523,489 | 6/1996 | Ting et al. | 568/347 |
| 5,600,012 | 2/1997 | Poyner et al. | 568/347 |
| 5,767,319 | 6/1998 | Ting et al. | 568/347 |

FOREIGN PATENT DOCUMENTS

| | | |
|---|---|---|
| 1145240 | 3/1960 | United Kingdom . |
| 98/18900 | 5/1998 | WIPO . |

OTHER PUBLICATIONS

Dekeukeleire et al. "The Structure of the Absolute Configuration of (–) Humulone," Tetrahedron, 26:385–393 (1970).

Veryele, M. "The Chemistry of Hops," Brewring Science vol. 1, Chapter 4, pp. 279–323 (1979).

Dekeukeleire et al. "Regiospecific Singlet Oxygen Oxidation of (–) R–Tetrahydrohumulone and Hexahydrocolupulone," Bull. Soc. Chem. Belg. 85, No. 5: 293–304 (1976).

Byrne et al. "Reduction Products from cis– and trans–s–Isocohumulone," J. Chem. Soc. p. 2810–2813 (1971).

Carson, J.F. "The Alkaline Isomerization of Humulone," Isohop Hydrogenation In Exptl., 74:4615–4620 (1952).

Verzele et al. "Sur La Transformation De L'Humulone," Cong. Internat. Indust. Ferm., pp. 297–301 (1947).

P. Margaret Brown, G.A. Howard, and A.R. Tatchell, "Chemistry of Hop Constituents, Part XIII. The Hydrogenation of isoHumulone," *Journal of The Chemical Society*, Jan. 1959, p. 545–551.

W.J.G. Donnelly and P.V.R. Shannon, "cis—and trans–Tetrahydroisohumulones," Journal of The Chemical Society, 1970, pp. 524–530.

*Primary Examiner*—Nita Minnifield
*Assistant Examiner*—Khalid Masood
*Attorney, Agent, or Firm*—Morgan, Lewis & Bockius LLP

[57] ABSTRACT

A process for the removal of catalyst poisons from hops and hop extracts is disclosed. After processing the hops to extract the alpha or beta acids therein, the alpha or beta acids are treated with activated nickel catalyst. The activated nickel catalyst binds the catalyst poisons which are believed to be sulfur containing compounds. The activated nickel and catalyst poisons are separated from the alpha or beta acids, and the alpha or beta acids are then hydrogenated and isomerized into tetrahydroisoalpha acids.

21 Claims, No Drawings

5,965,777

PROCESS TO REMOVE CATALYST POISONS FROM HOP EXTRACTS

FIELD OF THE INVENTION

The present invention relates to the processing of hops for beer and ales, and in particular, the removal of compounds from components of hop extracts which are deleterious to catalysts used in hydrogenating components of hop extracts.

BACKGROUND OF THE INVENTION

Hops are an essential ingredient in the brewing industry. Hops, or the extracts thereof such as certain acids and oils, give to beer and ale such qualities as their distinctive bitter taste, mouthfeel, cling, aroma and foamability.

Traditionally, the entire hop was added to and boiled with the wort which resulted in the leaching of the hop constituents into the wort. More recently however, hops have been processed independently to extract the desired constituents, and these constituents are then added at some point in the brewing process. The independent extraction, processing, and addition of the hop components provides greater control over the brewing process.

Alpha acids, also referred to as humulones, are one of the above-mentioned extracts from hops. After extraction from the hops, the alpha acids are isomerized into isoalpha acids (isohumulones) by exposing them to high temperatures and basic conditions. Isoalpha acids contribute to the bitterness of beer. Beta acids, also referred to as lupulones, are another extract from hops. Beta acids can be converted into isoalpha acids through a series of steps including hydrogenation, oxidation, heating, and raising the pH (see U.S. Pat. No. 4,644,084 to Cowles and U.S. Pat. No. 4,918,240 to Todd et al.).

One problem well known in the brewing industry is that isoalpha acids are susceptible to degradation upon exposure to light. This degradation produces a highly undesirable skunk-like odor in the beer. It is also well known in the art that hydrogenating the isoalpha acids (or the precursor alpha or beta acids) will increase the light stability of the beer. This hydrogenation requires catalysis, such catalysis usually employing a palladium on carbon catalyst.

During the hydrogenation of alpha, beta, or isoalpha acids however, compounds which are referred to as catalyst poisons, and which are associated with the hop extract, foul the catalyst. This fouling of the catalyst causes the hydrogenation of the alpha, beta, or isoalpha acids to proceed slower than normal and eventually to cease before all of the alpha, beta, or isoalpha acids are hydrogenated. In some instances, the catalyst becomes so quickly fouled that it must be replaced during the middle of the hydrogenation process in order for the hydrogenation to proceed to completion. However, simple replacement or changeout of the catalyst is an unsuitable solution to the poisoning problem for at least two reasons. First, the substitution of a new catalyst midway through the hydrogenation process can promote the formation of overreaction products. Second, the catalyst is quite expensive, and frequent replacement of the catalyst greatly adds to the cost of production.

Consequently, an object of the present invention is to remove catalyst poisons from components of hop extracts prior to the hydrogenation of such components thereby preventing the fouling of hydrogenation catalysts and allowing the hydrogenation to proceed to completion.

Another object of the invention is to provide a hydrogenation process for components of hop extracts that will not contribute to the formation of overreaction products.

A further object of the invention is to extend the life of the hydrogenation catalyst thereby preventing the frequent changeout of the expensive catalyst.

SUMMARY OF THE INVENTION

The present invention solves the aforementioned problems of the prior art by removing from hop extracts compounds which would foul the catalyst that is used in the hydrogenation of the hop extract.

In the process of the present invention, unprocessed raw hops (hop cones) are first extracted with a solvent. Liquid carbon dioxide under pressure is the preferred solvent, but other solvents such as hexane can be used. The extract contains a multifarious blend of compounds such as alpha acids, beta acids, oils, sugars, and polyphenolic resins. This mixture is subsequently treated with water and potassium hydroxide, and the alpha acids are extracted into the aqueous portion of the mixture. This aqueous portion still contains beta acids, hop oils and hop waxes, but they are subsequently removed by cooling. Cooling causes the beta acids, hop oils and hop waxes to come out of solution as a waxy solid material which is then removed by filtration. The resulting filtrate is an approximately 15% concentration of alpha acids.

The alpha acid solution at this point still contains the poisons which would foul the hydrogenation catalyst. In order to prevent fouling of the catalyst, an activated nickel catalyst of the Raney Nickel type is added to the alpha acid solution. The activated nickel binds these poisonous compounds, which are believed to be sulfur or compounds containing sulfur, thereby removing them from solution. The subsequent removal of the activated nickel from the alpha acid solution takes with it the poisons bound by the activated nickel. After the removal of the catalyst poisons, the hydrogenation proceeds to completion in a reasonable time without having to change the hydrogenation catalyst.

Alternatively, the 15% alpha acid solution is reacidified with sulfuric acid. The reacidification causes the alpha acids to come out of solution as oily alpha acids which separate from the aqueous layer. The oily alpha acids are then treated again with potassium hydroxide and water to give an approximately 30% concentration of alpha acids in solution. This 30% solution of alpha acids is then treated with the activated nickel catalyst to remove the catalyst poisons, and it is thereafter subjected to hydrogenation in the presence of a palladium on carbon catalyst.

Similarly, beta acids extracted from hops may contain catalyst poisons, and the addition of an activated nickel catalyst to a solution of beta acids will remove the catalyst poisons from a solution of beta acids.

DETAILED DESCRIPTION OF THE PREFERRED EMBODIMENTS

The process of the present invention is implemented as follows. Unprocessed hops (hop cones) are first extracted with a solvent, preferably liquid carbon dioxide under pressure. This treatment is well known in the art as a means to extract many of the constituents of the hops including alpha acids, beta acids, sugars, hop oils and polyphenolic resins.

The resulting extract is then further processed to isolate the alpha acid portion. First, potassium hydroxide at a concentration ranging from 10–45% and water are added to the extract to form a solution. Enough potassium hydroxide is added to a raise the pH of the solution changing the alpha acids to their respective salts. The water provides a medium for the alpha acid salts to go into solution. The resulting solution is an approximately 15% concentration of alpha acids.

This 15% solution of alpha acids however still contains beta acids, hop oils and hop waxes. This solution can be treated with an activated nickel catalyst at this point, but the beta acids, hop oils and hop waxes in the alpha acid solution would bind with the activated nickel catalyst, thereby inhibiting the absorption of the catalyst poisons (more activated nickel catalyst could be added, but that becomes somewhat expensive). Therefore, the 15% alpha acid solution is preferably chilled to approximately 5–10° C., causing the beta acids, hop oils and hop waxes to come out of solution as a waxy solid. This waxy solid is then filtered out giving an approximately 15% alpha acid solution that is free of beta acids, hop oils and hop waxes and suitable for nickel pretreatment.

The chilled and filtered 15% alpha acid solution can be subsequently reacidified with sulfuric acid. A 30% concentration of sulfuric acid is normally used although other concentrations work quite well also. Enough sulfuric acid is added to reacidify the alpha acids causing them to come out of solution, i.e. separate from the aqueous phase, as oily alpha acids. The oily alpha acids are then treated with more potassium hydroxide and water to give an approximately 30% solution of alpha acids.

The solution of alpha acids (either 15% or 30%) is subjected to a pretreatment with activated nickel catalyst prior to the hydrogenation and isomerization of the alpha acids. The activated nickel catalyst binds the catalyst poisons present in the alpha acid solution. These poisons would foul the palladium on carbon catalyst used in the subsequent hydrogenation of the alpha acids preventing a complete hydrogenation.

The activated nickel catalyst used for the pretreatment consists of fine particles of the activated nickel immersed in water, and both the activated nickel catalyst and the water are added to the 15% or 30% alpha acid solution. The amount of activated nickel catalyst used depends on the amount of contaminants in the hop extract. Normally from 4 to 10 grams of the activated nickel catalyst is used per 200 grams of alpha acids in solution. The alpha acid solution and activated nickel catalyst mixture are permitted to react for two to four hours at a temperature range of 40° C. to 65° C. The pretreatment temperature is much lower than during the subsequent hydrogenation and this lower temperature, along with the lack of isomerization, prevents the degradation of the product. During pretreatment, the elemental nickel on the surface of the fine particles of the activated nickel catalyst adsorbs the catalyst poisons which are believed to be sulfur containing compounds.

After the pretreatment with the activated nickel catalyst, the activated nickel catalyst is filtered out of the alpha acid solution carrying with it the bound catalyst poisons. The removal of the poisons allows the hydrogenation to proceed at a faster rate and to proceed to completion without fouling the palladium on carbon catalyst. The filtered alpha acid solution is then subjected to basic pH and pressurized conditions in conjunction with the palladium on carbon catalyst to isomerize and hydrogenate the alpha acids into tetrahydroisoalpha acids. The tetrahydroisoalpha acids impart light stability, improved foam, and bitterness to the beer.

In a similar manner, catalyst poisons can be removed from a solution of beta acids. U.S. Pat. No. 4,918,240 to Todd et al., incorporated herein by reference, discloses a method of removing catalyst poisons from beta acids via the addition of magnesium or calcium ions. Such catalyst poisons could also be removed by employing the method of the present invention, in particular, by adding an amount of activated nickel catalyst commensurate with the amount of catalyst poisons in the beta acids.

The present invention is now described in conjunction with the following examples. These examples, which are meant to be illustrative in nature and not at all limiting, illustrate the protection of the palladium catalyst via the addition of the activated nickel catalyst.

EXAMPLE I

Treatment with Davidson Raney Nickel 2800

The starting material for each experiment was a 30% solution containing 180 grams of alpha acids, pH approximately 10.5, prepared from a liquid carbon dioxide extract of hops as described above. Samples 1 and 2 were pretreated by stirring for 3 to 4 hours with 10 grams of Davidson Raney nickel catalyst 2800, then filtered. Samples 3 and 4 were not pretreated.

All four samples were then subjected to isomerization-hydrogenation, using 32 grams of Englehard (Beachwood, Ohio) CP 56 catalyst (50% water-wet 5% palladium on carbon) for Samples 1, 2, and 3, and 64 grams of this catalyst for Sample 4. The reactions were run at 1400 psig and 120° C. for the times indicated in Table I, and monitored by HPLC. The area of the tetrahydroisoalpha acid chromatographic peak as a percentage of total peak area was used as a measure of percent conversion.

The benefits of Raney nickel pretreatment may be seen in the data tabulated in Table I. In untreated Sample 3, with a catalyst to alpha acid ratio of 0.18, the catalyst was poisoned and conversion of alpha acids to tetrahydroisoalpha acids was only 29%. Doubling the level of hydrogenation catalyst in Sample 4 overcame the effects of catalyst poisoning, but as discussed above, this is unacceptable because of the high cost of the catalyst and the possibility of overreduction products. In pretreated Samples 1 and 2, however, acceptable conversions were achieved with the lower level of hydrogenation catalyst.

TABLE I

Treatment with Davidson Raney Nickel Catalyst 2800

| Sample | 1 | 2 | 3 | 4 |
| --- | --- | --- | --- | --- |
| Raney nickel pretreatment | Yes | Yes | No | No |
| Weight of 50% water-wet hydrogenation catalyst, grams | 32 | 32 | 32 | 64 |
| Ratio of catalyst to alpha acids | 0.18 | 0.18 | 0.18 | 0.36 |
| Reaction time, hours | 4 | 3 | 3 | 2 |
| Percent conversion to tetrahydroisoalpha acids | 89 | 90 | 29 | 93.5 |

EXAMPLE 2

Treatment with Molybdenum-Promoted Raney Nickel

Three samples of 15% alpha acid solution made from a liquid carbon dioxide hop extract containing approximately 600 ppm sulfur were pretreated at 50° C. with Davidson molybdenum-promoted Raney nickel 3100, then filtered. Amounts of Raney nickel used and treatment times are noted in Table II. The fourth sample was not pretreated. The samples were then treated as previously described with sulfuric acid followed by potassium hydroxide solution to provide purified 30% alpha acid solutions, which were subjected to isomerization-hydrogenation in the presence of Engelhard CP 56 catalyst as in Example 1. Concentrations, catalyst levels, and percent conversion to tetrahydroisoalpha acids as a function of time are given in Table II. After four hours, conversion of alpha acids to tetrahydroisoalpha acids was 87–88% in pretreated Samples 1, 2, and 3, indicating that catalyst poisons were successfully removed from the alpha acid solutions and hydrogenation was substantially complete. In contrast, conversion to tetrahydroisoalpha acids in untreated Sample 4 was only 74% complete after five hours, and the reaction had stopped.

TABLE II

Treatment with Molybdenum - Promoted Raney Nickel

| Sample | 1 | 2 | 3 | 4 |
|---|---|---|---|---|
| Pretreatment | | | | |
| Weight of Raney nickel, grams | 4.0 | 6.0 | 8.0 | None |
| Time, hours | 4 | 4 | 2 | — |
| Nickel conc. after treatment, ppm | 9.7 | 9.6 | 12.3 | — |
| Hydrogenation | | | | |
| Alpha acid conc., percent | 30.2 | 29.9 | 31.3 | 28.9 |
| Alpha acid weight, grams | 196 | 194 | 203 | 180 |
| Weight of 50% water-wet catalyst, grams | 40.1 | 38.8 | 40.6 | 36 |
| Ratio of catalyst to alpha acids | 0.20 | 0..20 | 0.20 | 0.20 |
| Percent conversion to tetrahydroisoalpha acids: | | | | |
| 1 hour | 70 | 73 | 67 | 48 |
| 2 hours | 79 | 80 | 80 | 59 |
| 3 hours | 83 | 82 | 85 | 70 |
| 4 hours | 88 | 88 | 87 | 74 |
| 5 hours | 88 | | | 74 |

EXAMPLE 3

Treatment with 10 Grams of Activated Raney Nickel Catalyst

This example illustrates how a solution containing 200 grams of alpha acids, in a 15% or 30% solution, is treated with 10 grams of Raney nickel catalyst in a manner as described in Examples 1 and 2. A solution containing 200 grams of alpha acids is pretreated by stirring for approximately two hours with 10 grams of Raney nickel catalyst, then subjected to isomerization-hydrogenation in the presence of 20 grams of hydrogenation catalyst (as 40 grams of 50% water wet catalyst), giving a ratio of catalyst to alpha acids of 0.20.

While the invention has been described in terms of the foregoing examples, those skilled in the art will realize the invention can be practiced with modification within the spirit and scope of the appended claims.

I claim:

1. A process for the removal of catalyst poisons from hops containing acids, said process comprising the steps of:
   (i) isolating said acids from said hops; and
   (ii) treating said acids with an activated nickel catalyst wherein said activated nickel catalyst is present in an amount effective to bind said catalyst poisons to said activated nickel catalyst and wherein said catalyst poisons comprise compounds that foul hydrogenation catalysts used in the hydrogenation of alpha, beta and isoalpha acids.

2. The process for the removal of catalyst poisons from hops according to claim 1, further comprising the step of hydrogenating and isomerizing said acids into tetrahydroisoalpha acids.

3. The process for the removal of catalyst poisons from hops according to claim 1, wherein said acids are beta acids.

4. The process for the removal of catalyst poisons from hops according to claim 1, wherein said acids are alpha acids.

5. The process for the removal of catalyst poisons from hops according to claim 2, wherein said acids are alpha acids.

6. The process for the removal of catalyst poisons from hops according to claim 4, wherein said isolating step comprises:
   (a) extracting said hops with a solvent capable of extracting said alpha acids to produce an extract containing said alpha acids; and
   (b) adding a first portion of water and potassium hydroxide to said extract, thereby converting said alpha acids to a salt form producing a solution of alpha acids.

7. The process for the removal of catalyst poisons from hops according to claim 6, further comprising the step of adding sulfuric acid to said solution thereby causing said alpha acids to come out of solution.

8. The process for the removal of catalyst poisons from hops according to claim 7, further comprising the step of adding a second portion of water and potassium hydroxide to said alpha acids out of solution in an amount sufficient to produce a solution of alpha acids.

9. The process for the removal of catalyst poisons from hops according to claim 6, wherein said solvent is selected from the group consisting of liquid carbon dioxide and hexane.

10. The process for the removal of catalyst poisons from hops according to claim 6, wherein said treatment with activated nickel catalyst occurs after said addition of water and potassium hydroxide and further comprising the step of adding sulfuric acid to said solution thereby causing said alpha acids to come out of solution.

11. The process for the removal of catalyst poisons from hops according to claim 8, wherein said treatment with activated nickel catalyst occurs after said addition of said second portion of water and potassium hydroxide.

12. The process for the removal of catalyst poisons from hops according to claim 4, wherein said activated nickel catalyst is added to said alpha acids at a concentration between the ratios of 1 part of said activated nickel catalyst per 50 parts of said alpha acids by weight and 1 part of said activated nickel catalyst per 20 parts of said alpha acids by weight.

13. The process for the removal of catalyst poisons from hops according to claim 1, wherein said activated nickel catalyst is added in an amount effective to remove a sufficient amount of said catalyst poisons to prevent the fouling of hydrogenation catalysts used in the hydrogenation of alpha, beta and isoalpha acids.

14. The process for the removal of catalyst poisons from hops according to claim 4, wherein said alpha acids and said activated nickel catalyst are allowed to react for two to four hours at 40° C. to 65° C.; and further comprising the step of
   filtering said activated nickel catalyst from said alpha acid solution, thereby removing said catalyst poisons from said alpha acid solution.

15. The process for the removal of catalyst poisons from hops according to claim 5, wherein said hydrogenation step comprises exposing said alpha acids to a palladium on carbon catalyst.

16. The process for the removal of catalyst poisons from hops according to claim 5, wherein said isomerization and hydrogenation steps comprise exposing said alpha acids to a temperature of approximately 120° C. and a pH of approximately 10.5 for 2 to 4 hours.

17. A process for the removal of catalyst poisons from hop extracts, said hop extracts comprising alpha acids and beta acids, said process comprising the steps of:
  (i) separating said alpha acids from said beta acids;
  (ii) treating said alpha acids with an activated nickel catalyst, wherein said activated nickel catalyst is present in an amount effective to bind said catalyst poisons to said activated nickel catalyst; and
  (iii) hydrogenating and isomerizing said alpha acids into tetrahydroisoalpha acids.

18. The process for the removal of catalyst poisons from hop extracts according to claim 17, further comprising the steps of:
  (a) treating said beta acids obtained from said separation step (i) with an activated nickel catalyst; and thereafter
  (b) converting said beta acids into tetrahydroisoalpha acids.

19. The process for the removal of catalyst poisons from hop extracts according to claim 17, wherein said separating step (i) comprises the steps of:
  (a) adding potassium hydroxide and water to said hop extract to form a solution;
  (b) chilling said solution to about 5 to about 10° C. to form a waxy solid comprising said beta acids; and
  (c) separating said waxy solid comprising said beta acids from said solution by filtration.

20. A method for improving beer, comprising the step of adding to said beer a tetrahydroisoalpha acid prepared according to the process of claim 17.

21. A process for the production of beer, comprising the step of adding a tetrahydroisoalpha acid prepared according to the process of claim 18.

* * * * *

UNITED STATES PATENT AND TRADEMARK OFFICE
CERTIFICATE OF CORRECTION

PATENT NO. : 5,965,777
DATED : October 12, 1999
INVENTOR(S) : Gauthier

It is certified that error appears in the above-identified patent and that said Letters Patent is hereby corrected as shown below:

Title page, under item [56],

Name of Law Firm, change "Morgan, Lewis & Rockius LLP" to

--Morgan, Lewis & Bockius LLP--.

Signed and Sealed this

Eighteenth Day of July, 2000

*Attest:*

Q. TODD DICKINSON

*Attesting Officer*      *Director of Patents and Trademarks*

UNITED STATES PATENT AND TRADEMARK OFFICE
CERTIFICATE OF CORRECTION

PATENT NO. : 5,965,777
DATED : October 12, 1999
INVENTOR(S) : Gauthier

It is certified that error appears in the above-identified patent and that said Letters Patent is hereby corrected as shown below:

On the title page, item [73]:

Assignee, change "Cultor Food Services, Inc." to --Haas Hop Products,

Inc.--.

Signed and Sealed this

Sixth Day of March, 2001

Attest:

NICHOLAS P. GODICI

Attesting Officer    Acting Director of the United States Patent and Trademark Office